Dec. 14, 1954   M. L. LINDENBERG ET AL   2,696,717
ICE-MAKING APPARATUS

Filed March 18, 1950   2 Sheets-Sheet 1

Inventors
Milton L. Lindenberg
Leo R. King
By Williamson & Williamson
Attorneys

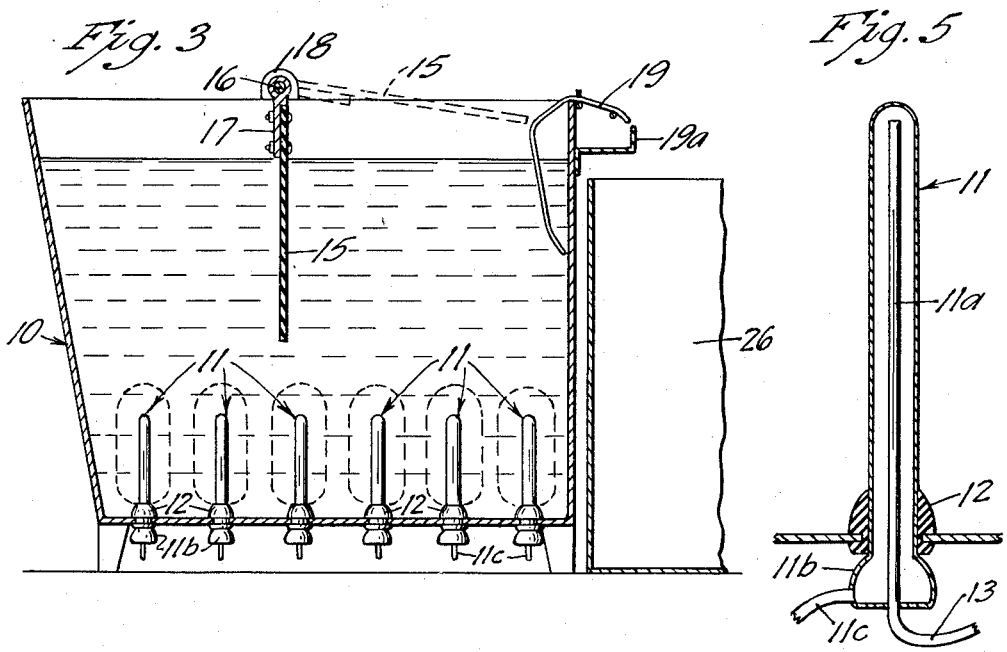
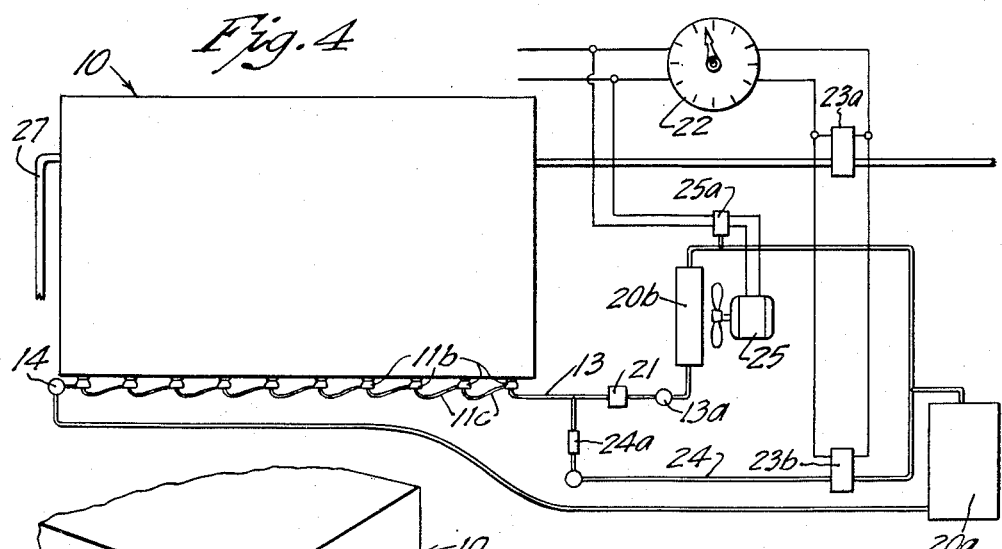
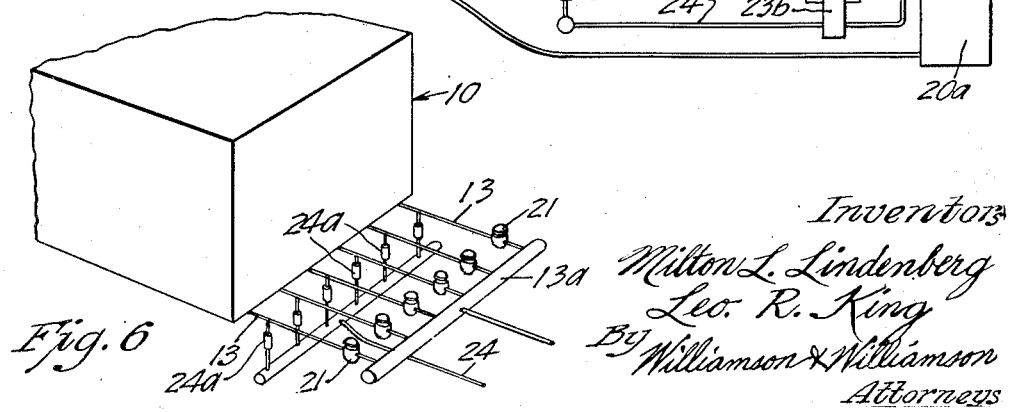

United States Patent Office 2,696,717
Patented Dec. 14, 1954

2,696,717
ICE-MAKING APPARATUS

Milton L. Lindenberg and Leo R. King, Faribault, Minn.

Application March 18, 1950, Serial No. 150,492

7 Claims. (Cl. 62—106)

This invention relates generally to an ice cube maker and particularly to apparatus for producing and harvesting ice bodies.

It is an object of our invention to provide novel and improved apparatus for producing and harvesting ice bodies.

It is another object to provide apparatus for producing substantially clear ice bodies and for subsequently harvesting the same.

Still another object is to provide apparatus for producing ice bodies, and having a movable element for agitating liquid while it is being frozen and mechanism for cooperating with said agitating element to harvest the ice bodies after freezing.

More specifically, it is an object to provide apparatus for freezing ice bodies, having a liquid confining tank with a rotary paddle mounted therein for agitating the liquid during the freezing operation to produce clear ice bodies, and providing means for releasing the frozen bodies, said rotary agitator carrying said bodies out of the tank to a suitable storage location.

It is still a further object to provide apparatus for producing and harvesting ice bodies, in which the temperature of the gas under pressure is maintained substantially constant to produce sufficient heat for the hot gas defrosting cycle.

These and other objects and advantages of our invention will more fully appear from the following description made in connection with the accompanying drawings wherein like reference characters refer to similar parts throughout the several views and in which:

Fig. 3 is a transverse vertical sectional view taken substantially along the line 3—3 of Fig. 2, and showing the agitating and ice removing paddle in discharging position;

Fig. 4 is a diagrammatic view showing in side view a conventional reverse cycle refrigeration system with a time clock for controlling the cycles of operation and a switch for controlling the operation of a condenser cooling fan;

Fig. 5 is a central vertical sectional view showing a typical freezing tube and the mounting of said tube in the tank bottom; and Fig. 6 is an end perspective view showing the connection of the refrigerant fluid supply lines, supply manifolds, expansion valves and check valves.

Figure 1:
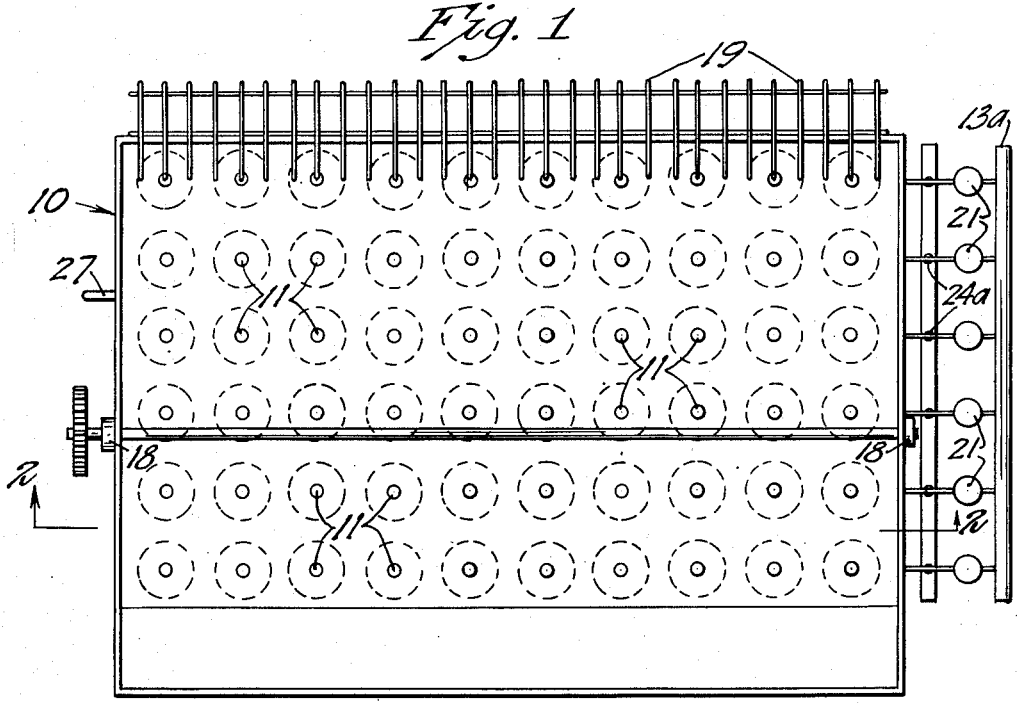
Fig. 1 is a top plan view of our assembled freezing tank.
Figure 2:
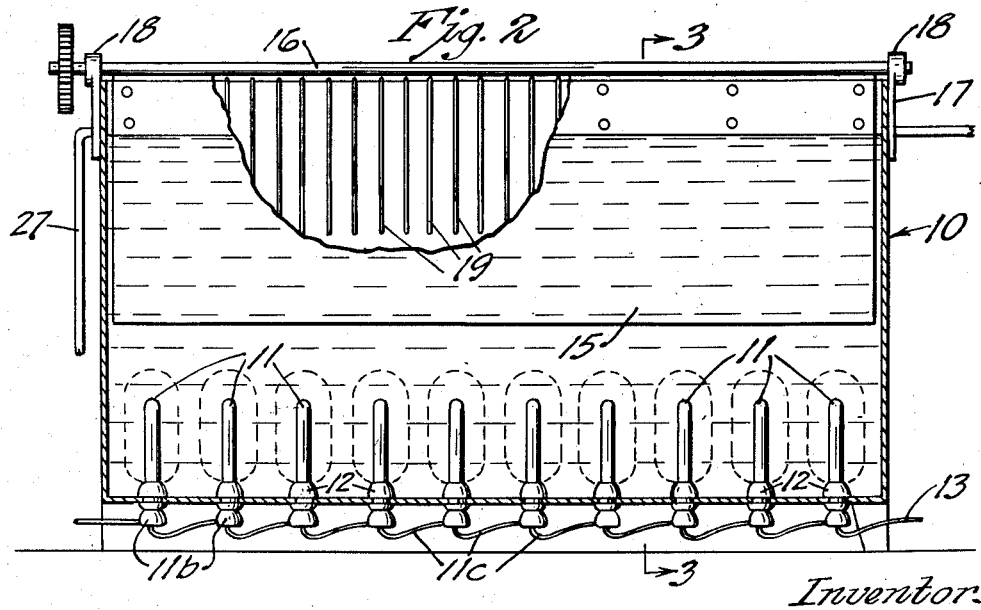
Fig. 2 is a longitudinal sectional view taken substantially along the line 2—2 of Fig. 1.

As illustrated in Figs. 1 through 3 inclusive we provide a liquid confining tank 10 made from any suitable material. In the form shown the tank 10 has an open top. A plurality of freezing tubes or fingers 11 are fixed in the bottom of the tank in thermally insulated relation to said tank bottom as by being respectively mounted in rubber grommets 12 which surround the lower portions thereof, as best shown in Figs. 2, 3 and 5. These tubes 11 are hollow with closed dome-shaped tops in the form shown. Each tube, or finger, as best shown in Fig. 5, has a centrally disposed refrigerant conduit 11a extending upwardly therein to the extreme upper portion thereof. An annular space surrounds this discharge conduit 11a and permits substantially free flow of refrigerant fluid downwardly within the tube 11 to the enlarged bottom portion thereof 11b. An interconnection conduit 11c interconnects each bottom enlarged portion 11b with the discharge conduit 11a of the next adjacent tube 11 in each row of tubes. A plurality of refrigerant supply lines 13 respectively supply refrigerant fluid to the rows of tubes, as best shown in Fig. 6. A refrigerant supply manifold 13a is connected to a conduit running from the condenser 20b of the refrigeration system. A suction manifold 14 is provided to receive the refrigerant from each row of tubes 11 and a suction line draws the refrigerant fluid from said manifold 14 back to a compressor 20a.

An agitator, such as the rotary paddle 15, is mounted in the upper portion of the tank 10. The rotary paddle 15 is fixed to a shaft 16 as by the mounting plate 17 and in the form shown said paddle is made of resilient material such as rubber for purposes that will be brought out hereafter. The shaft 16 is journalled in suitable bearings 18 mounted in the upper portion of the tank 10 and any conventional means for rotating said shaft and paddle may be provided, such as the toothed pinion which is adapted to be connected to any source of rotary power. Suitable means for guiding the released cubes into a storage location while draining the water therefrom is provided along one longitudinal edge of the tank 10. In the form shown this consists in a number of spaced cube engaging elements 19 which extend downwardly inside the tank 10 and upwardly over the top edge of the side of the tank and outwardly beyond the side wall thereof. A drain trough 19a is mounted under the outwardly extending portions of the cube engaging elements 10 to collect the water drained from the cubes as they pass over said elements 19.

A conventional refrigeration system employing the reverse cycle hot gas defrost principle is connected to the supply lines 13. During the freezing cycle this system is designed to supply compressed gas from the compressor 20a to the condenser 20b. The liquified refrigeration fluid then passes through the expansion valves 21 into the respective supply lines 13. This cold fluid produces freezing temperatures within the tubes 11 about which the ice will form.

As best shown in Fig. 4, a time clock 22 controls the electric circuit through a pair of solenoid valves 23a and 23b. The valve 23a is mounted in a water supply line and is normally closed but is opened upon energization of the solenoid winding by the time clock to supply water to the tank 10. The valve 23b is connected in the supply line 24 which is T'd off of the high side of the refrigerant line between the compressor 20a and condenser 20b to permit the hot compressed gas from the compressor to flow through the lines 13 and tubes 11 to defrost the system and remove the cubes from the said tubes.

A cooling fan 25 is directed toward the condenser 20b to dissipate the heat produced therein during the freezing cycle. An electric switch 25a is connected in the electric circuit of the fan motor to control the operation of the fan. In the form shown this switch 25a is actuated by the pressure in the refrigerant fluid supply line running between the compressor and the condenser. When the pressure falls below a predetermined limit the circuit through the fan motor will be opened and the fan will be immediately stopped so that additional heat and pressure will be built up and maintained in the condenser. As long as the pressure in said line remains above this predetermined limit the fan 25 will be operated to dissipate the heat in the condenser and prevent overheating therein. This switch could be thermally operated as well as being pressure responsive and work equally well in that form. The purpose of this fan control switch 25a is to maintain sufficient heat in the system during the freezing cycle to produce a highly effective hot gas defrost cycle when the cubes are to be released from the tubes 11.

The hot gas line 24 is connected to a hot gas manifold from which each supply line 13 is supplied through the respective check valves 24a. These check valves 24a prevent the refrigerant fluid, during the freezing cycle, from flowing from one supply line 13 to another and cause certain of the thermostatic expansion valves 21 to become inoperative. The defrost cycle begins by the opening of the valve 23b to supply the gas from the compressor as well as from the condenser. Until the pressure in the line from the compressor to the condenser is equalized hot gas will continue to flow back from the condenser to the hot gas supply line 24 in addition to the gas supplied from the compressor. The expansion valves 21 will, of course, be shut off as soon as the pressure in the lines 13 equalizes or becomes greater than the pressure within the condenser. Also, the fact that the orifices of the expansion valves are of a relatively small diameter, little if any gas will flow through the expansion valves because of the high resistance of these small orifices so that as soon as the solenoid valve 23b is opened hot gas will begin to flow through the line 24, check valve 24a and each row of tubes 11. Each row of tubes, of course, in effect forms an individual coil in the sytem and must be treated as a unit. When the solenoid valve 23b is open the water control solenoid valve 23a is also opened by the time clock 22 and supplies water to the tank 10 to maintain the water level therein when the frozen bodies are removed from the said tank.

The following is a description of the operation of our improved ice producing and harvesting apparatus. During the freezing cycle the compressed gas flows from the compressor 20a to the condenser 20b and is liquified in said condenser and thereafter passes through the respective expansion valves 21 and the respective freezing coils to freeze ice bodies on the tubes 11. The paddle 15 is continuously rotated during the freezing cycle to agitate the water within the tank and produce substantially clear ice on each of the tubes 11. The paddle is continuously rotated also during the defrost cycle for purposes that will be brought out hereafter. After the freezing cycle has been in operation for a predetermined time the clock 22 will open the valves 23a and 23b to immediately start the defrosting cycle. The gas in the system having been maintained above a predetermined temperature by the control of the fan 25 will be sufficiently hot to produce relatively fast releasing of the ice from the tubes 11. The natural buoyancy of the ice bodies will lift them from the tubes and cause the same to float on the surface of the liquid in the tank. As the paddle 15 is rotated in the tank during the defrost cycle it will carry the floating cubes over to one side of the tank and lift the same onto the draining and guiding elements 19 from which said cubes will be delivered into the basket or bin 26. The liquid level within the tank 10 must be maintained substantially constant in order that the paddle 15 will effectively operate to remove the cubes from the tank.

It will be seen that we have provided an extremely efficient relatively simple apparatus for producing and harvesting ice bodies in which substantially clear ice is initially frozen and thereafter released from the freezing elements to float in the freezing tank and thereafter is automatically removed from the tank by the continuously operating paddle member 15.

It will, of course, be understood that various changes may be made in the form, details, arrangement and proportions of the parts without departing from the scope of our invention.

What we claim is:

1. Apparatus for producing and harvesting clear ice bodies comprising a liquid confining tank having bottom and side panels, a plurality of freezing elements mounted on the tank bottom below the surface of the liquid in the tank, said freezing elements being adapted to be connected to a refrigeration system for freezing portions of said liquid into solid ice bodies, means for releasing the ice bodies from said elements to float on the surface of the liquid in the tank, a shiftable agitating and removing paddle swingably mounted on said tank for movement into and out of the liquid thereof and constructed with the lower edge portion thereof disposed in closely spaced relation to said freezing elements at the bottom of the arcuate swinging movement of said paddle, and driving mechanism connected with said paddle to produce arcuate swinging movement thereof into and out of the liquid in the tank to agitate said liquid in close proximity to the freezing elements and produce clear bodies and to carry the floating bodies released from said elements out of said tank while draining the liquid from the bodies and delivering said bodies to a storage location.

2. The structure set forth in claim 1 and a stationary guiding and draining structure mounted on the delivery side wall panel and disposed substantially adjacent the outer edge of the paddle when the same is swung upwardly out of the liquid in the tank to deliver the ice bodies onto said guiding and draining structure for subsequent delivery to a storage location.

3. The structure set forth in claim 1 and said paddle being mounted on a rotary shaft journalled for rotation on an axis above the liquid level in the tank and at least the outer portion of said paddle being constructed of resilient material.

4. Apparatus for producing ice bodies comprising a liquid confining tank with a sealed panel provided with a plurality of spaced apart finger receiving apertures disposed below the liquid level of the tank, a plurality of hollow freezing fingers respectively mounted through the apertures in said panel below the liquid level in the tank, a hollow insulating element closely surrounding the base of each of said fingers adjacent said tank panel and extending a substantial distance along the respective fingers into said tank to maintain the ice bodies frozen on said fingers in spaced relation to the inside surface of the tank panel, a refrigeration system connected with said fingers for producing freezing temperatures thereon, and means for circulating warming material in said fingers to release the frozen solids formed thereon to float in the tank liquid.

5. The structure set forth in claim 4, and said fingers being slightly smaller than said apertures with said hollow insulating elements comprising resilient insulating and sealing grommets sealingly surrounding each of said fingers to close the space between the fingers and peripheries of the apertures and having a transversely disposed circumferential groove adapted to sealingly receive the adjacent portion of the tank panel in which the respective fingers are mounted.

6. Apparatus for producing and harvesting clear ice solids comprising a liquid confining tank having sealed bottom and side walls, a plurality of freezing elements mounted in said tank a substantial distance below the liquid level therein and adapted to be connected to a refrigeration system for freezing portions of said liquid into ice solids and having means associated therewith for releasing the solids therefrom to float on the surface of the liquid within the tank, a shiftable liquid agitating and ice solid engaging and removing member mounted for swinging movement on said tank and having a portion thereof extending a substantial distance below the liquid level of the tank and disposed in closely spaced relation to said freezing elements when in one position for agitating the liquid around the entire freezing surface area of said freezing elements during the freezing of ice solids thereon to produce clear ice bodies and disposed in closely spaced relation to a side wall of the tank when in another position, and shifting mechanism connected with said member for carrying the ice solids released to float in said tank out of said tank and delivering the same over a side wall of the tank.

7. Apparatus for producing ice bodies comprising a liquid confining tank having a bottom provided with apertures and upstanding side panels, a plurality of hollow upwardly extending freezing fingers mounted in the said apertures of the bottom panel of said tank with the upper ends of said fingers being closed and disposed below the liquid level in the tank, means for circulating a refrigerant through the hollow fingers, and sealing and heat insulating grommets in said apertures and surrounding the base portion of each of said fingers adjacent the inner surface of said bottom panel to maintain the ice bodies frozen on said fingers in spaced relation from said inside panel surfaces.

References Cited in the file of this patent

UNITED STATES PATENTS

| Number | Name | Date |
|---|---|---|
| 529,194 | Richter | Nov. 13, 1894 |
| 2,105,460 | Gaugler | Jan. 11, 1938 |
| 3,133,521 | Wussow et al. | Oct. 18, 1938 |
| 2,221,212 | Wussow et al. | Nov. 12, 1940 |
| 2,253,512 | Fechner et al. | Aug. 26, 1941 |
| 2,349,451 | Motz | May 23, 1944 |
| 2,443,203 | Smith | June 15, 1948 |
| 2,551,758 | Newton | May 8, 1951 |
| 2,590,499 | Braswell, Jr. | Mar. 25, 1952 |

FOREIGN PATENTS

| Number | Country | Date |
|---|---|---|
| 925,476 | France | Mar. 31, 1947 |